United States Patent [19]
Jourdain et al.

[11] Patent Number: 6,078,395
[45] Date of Patent: Jun. 20, 2000

[54] TUNABLE FABRY-PÉROT INTERFEROMETER WITH FLOATING ELECTRODE ON ONE MIRROR AND CONTROL ELECTRODE PAIR ON OPPOSING MIRROR

[75] Inventors: Anne Jourdain, Sassenage; Claude Bieth, Claix, both of France

[73] Assignee: Commissariat a l'Energie Atomique, Paris, France

[21] Appl. No.: 09/145,261

[22] Filed: Sep. 2, 1998

[30] Foreign Application Priority Data

Sep. 19, 1997 [FR] France .................................. 97 11696

[51] Int. Cl.[7] ...................................................... G01B 9/02
[52] U.S. Cl. .............................................................. 356/352
[58] Field of Search ............................................... 356/352

[56] References Cited

U.S. PATENT DOCUMENTS

| 4,859,060 | 8/1989 | Katagiri et al. | 356/352 |
|---|---|---|---|
| 5,561,523 | 10/1996 | Bloomberg et al. | 356/352 |
| 5,646,729 | 7/1997 | Koskinen et al. | 356/352 |
| 5,909,280 | 6/1999 | Zavracky | 356/352 |

FOREIGN PATENT DOCUMENTS

| 0 219 359 | 4/1987 | European Pat. Off. . |
|---|---|---|
| 0 668 490 | 8/1995 | European Pat. Off. . |
| 0 693 683 | 1/1996 | European Pat. Off. . |

OTHER PUBLICATIONS

Jerman et al, "A Miniature Fabry–Perot Interferometer Fabricated Using Silicon Micromachining Techniques", IEEE, 1988, pp16–18.

"Electrically Tunable Micromachined Fabry–Perot Interferometer In Gas Analysis", M. Blomberg, A. Torkkeli and A. Lehto, published in "Physica Scripta", vol. T69, pp. 119–121, 1997.

"Carbon Dioxide Sensor Based On Micromachined Fabry–Perot Interferometer", M. Viitasalo, M. Hohtola, M. Blomberg, Ch. Helenelund, A. Torkkeli, and A. Lehto, published in "Sensor 97", poster A7.36, pp. 193–198.

*Primary Examiner*—Samuel A. Turner
*Attorney, Agent, or Firm*—Burns Doane Swecker & Mathis L.L.P.

[57] ABSTRACT

An electrostatically controlled, tunable Fabry-Pérot interferometer is provided with a first, fixed mirror (4) to which a floating electrode (2) is fitted, a second, movable mirror (6) to which first and second control electrodes (8, 10) are fitted, and a resonant cavity of length d, defined by the first and second mirrors. The application of an electrical voltage between the two control electrodes operates to cause displacement of the movable mirror in relation to the fixed mirror, thereby modifying the length of the resonant cavity of the Fabry-Pérot interferometer.

25 Claims, 5 Drawing Sheets

TUNABLE FABRY-PÉROT INTERFEROMETER WITH FLOATING ELECTRODE ON ONE MIRROR AND CONTROL ELECTRODE PAIR ON OPPOSING MIRROR

FIELD OF THE INVENTION AND BACKGROUND ART

The present invention relates to the field of interferometry, in particular the construction of an electrostatically-controllable, tunable Fabry-Pérot interferometer. This type of apparatus may, for example, be used as an interferometric filter.

Documents EP-668 490 and EP-693 683 describe electrostatically-controlled integrated Fabry-Pérot interferometers.

This type of interferometer is also described in an article by M. Blomberg et al. entitled "Electrically Tunable Micromachined Fabry-Pérot Interferometer in Gas Analysis" published in "Physica Scripta", vol. T69, pages 119–121, 1997 and also in an article by M. Viitasalo et al. entitled "Carbon Dioxide Sensor based on Micromachined Fabry-Pérot Interferometer" published in SENSOR 97, Poster A7.36, pages 193–198.

These documents describe an optical resonant cavity machined in a silicon substrate. The cavity consists of a layer of air of thickness $\lambda/2$, where $\lambda$ is the working wavelength, machined between two parallel dielectric mirrors. One of the mirrors is movable while the other is fixed. Each mirror is fitted with control electrodes which may consist of deposits of highly-doped conducting silicon layers. Applying a potential difference between the control electrodes draws the movable mirror towards the fixed mirror, thereby altering the dimensions of the air gap and thus the resonance wavelength.

In the apparatus described in EP-668 490 the electrode of the movable mirror is annular and the perimeter of the mirror is machined to make it thinner, thereby rigidifying the center and improving the plane displacement of the useful optical zone in the center.

The apparatuses described in these documents use control electrodes fitted to the two parallel mirrors. Electrostatic command is achieved directly by applying a voltage across these electrodes. This technique requires electric contacts to be made with two conducting surfaces positioned facing one another, thereby increasing the complexity of the apparatus and the procedure required to construct it. In particular the contact with the upper mirror is difficult to achieve and requires local stacking of highly doped layers. Great care must be taken to insulate the various active components and avoid the possibility of short-circuits.

DISCLOSURE OF THE INVENTION

The present invention relates to an electrostatically-controlled, tunable Fabry-Pérot interferometer comprising:
 a first mirror to which a floating electrode is fitted,
 a second mirror to which first and second control electrodes are fitted, one of the first and second mirrors being fixed while the other is movable,
 a resonant cavity of length d, defined by the first and second mirrors, the application of an electrical voltage between the two control electrodes causing displacement of the movable mirror in relation to the fixed mirror, thereby modifying the length of the resonant cavity.

Since the electrode fitted to one of the mirrors is a floating electrode, no contact is required with this mirror. In the final system there is therefore only one point at which contact needs to be made, namely the control electrodes.

Consequently, the interferometer of the invention is still electrostatically controlled but the two control electrodes are both fitted to one side of the apparatus.

The floating electrode and the mirror to which it is fitted may be constructed on the surface of a first substrate. For example, the substrate may be made of silicon and the floating electrode may be made of doped silicon.

The other mirror and its control electrodes may be constructed on the surface of a second substrate, also made, for example, of silicon.

In one embodiment of the invention the movable mirror may consist of a membrane etched into a substrate.

The control electrodes may be formed on either side of a reflecting zone to which they are fitted, for example the movable mirror. In other words, the mirror comprises a central reflecting zone and lateral zones on which the control electrodes are mounted.

The central reflecting zone may be circular in shape. Where this is the movable mirror this circular shape defined by the control electrodes allows for perfectly plane displacement of the movable reflecting zone since the electrostatic attraction only occurs at the periphery of the zone, thereby providing a filter output fitted with a diaphragm.

The control electrodes may consist of a metallic deposit. Moreover, electrical contacts may be made directly with the control electrodes on the surface of one of the substrates.

The invention also relates to a procedure for constructing a tunable Fabry-Pérot interferometer comprising:
 a stage for constructing a first assembly comprising a first mirror and a floating electrode fitted to the said first mirror,
 a stage for constructing a second assembly comprising a second mirror, having a reflecting zone and a first and second control electrode fitted to the said second mirror, one of the mirrors being fixed while the other is movable,
 a stage for constructing a resonant cavity of length d, defined by the first and second mirrors, by assembling the first and second assemblies, applying an electric voltage between the control electrodes causing displacement of the reflecting zone of the movable mirror relative to a fixed mirror and thereby modifying the length d of the cavity.

In particular, the floating electrode and the corresponding mirror may be constructed on the surface of a first substrate. For example, the substrate may be made of silicon and the floating electrode may be constructed by doping a thin film of silicon on the surface of the first mirror formed by at least one dielectric layer, the first mirror itself being deposited on the substrate. The floating electrode may also be constructed by a metallic deposit disposed on the mirror.

The other mirror, together with the first and second control electrodes, may be constructed on the surface of a second substrate. For example, said second mirror may consist of a membrane, one part of which (the movable reflecting zone) is made movable by etching the second substrate.

The control electrodes may be constructed by metallic deposition on one of the mirrors.

DETAILED DISCLOSURE OF EMBODIMENTS OF THE INVENTION

Figure 1:
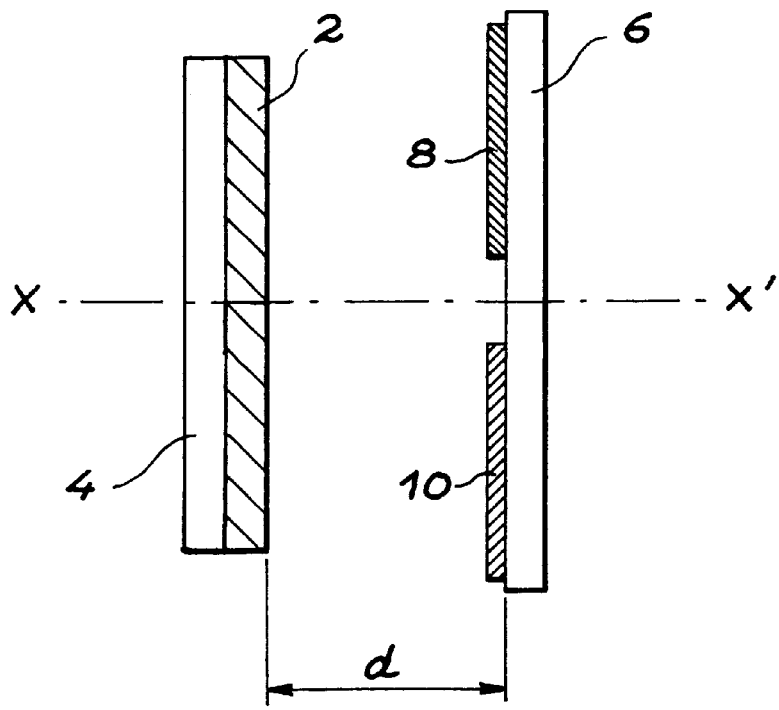
FIG. 1 is a diagram of a Fabry-Pérot interferometer according to the invention.

FIG. 1 shows the structure of an electrostatically-controllable, tunable Fabry-Pérot interferometer according to the invention.

The structure comprises a first, fixed, mirror 4 fitted with a floating electrode 2. Fixed mirror 4 is formed, for example, on a substrate. Floating electrode 2 is fitted to the surface of mirror 4. Said mirror 4 consists of a stack of layers with different dielectric characteristics, for example $SiO_2$ and undoped Si, or at least one layer of $SiO_2$ and one layer of undoped Si, undoped Si being a dielectric. The floating electrode may be the last layer of the stack forming the mirror; in this configuration it is composed of doped, and therefore conducting, silicon. A second mirror 6 is fitted facing fixed mirror 2 so that it can move around axis XX' of the interferometer. Two control electrodes 8, 10 are fitted to this second mirror. These electrodes may, for example, be constructed by electroplating part of the reflecting membrane forming the second mirror 6.

The two mirrors are maintained at a distance d relative to one another. This distance constitutes the length of the resonant cavity formed by mirrors 4, 6.

The two mirrors are maintained at distance d by means, for example, of cross-pieces, stops or spacers not shown in FIG. 1.

Applying an electric voltage using means not shown in FIG. 1 between the two control electrodes 8, 10 causes a displacement of movable mirror 6 relative to the fixed mirror along axis XX', thereby modifying the length of the resonant cavity.

The length d of the Fabry-Pérot cavity can be described by the relation:

$$2nd = m\lambda \quad (1),$$

where d is the length separating the reflecting surfaces, m is a whole number, n is the refraction coefficient of the cavity located between the two mirrors and $\lambda$ is the wavelength. Any variation in d therefore causes a variation in the central wavelength of the interferometer pass band.

Electrically speaking, the cavity thus formed defines a capacity $C_1$ between control electrodes 8, 10 and floating electrode 2. Applying an electrical voltage between the control electrodes modifies, via the capacity $C_1$ of the air gap, the potential of floating electrode 2; movable mirror 6 is thus drawn towards the fixed mirror.

The procedure described above does not change if the floating electrode is fitted to the movable mirror and the control electrodes are fitted to the fixed mirror. A detailed description is given below of a configuration in which the floating electrode is fitted to the fixed mirror. But the invention applies to both configurations; the second configuration can easily be constructed by taking the first and reversing the control and reference electrodes.

Figure 2:
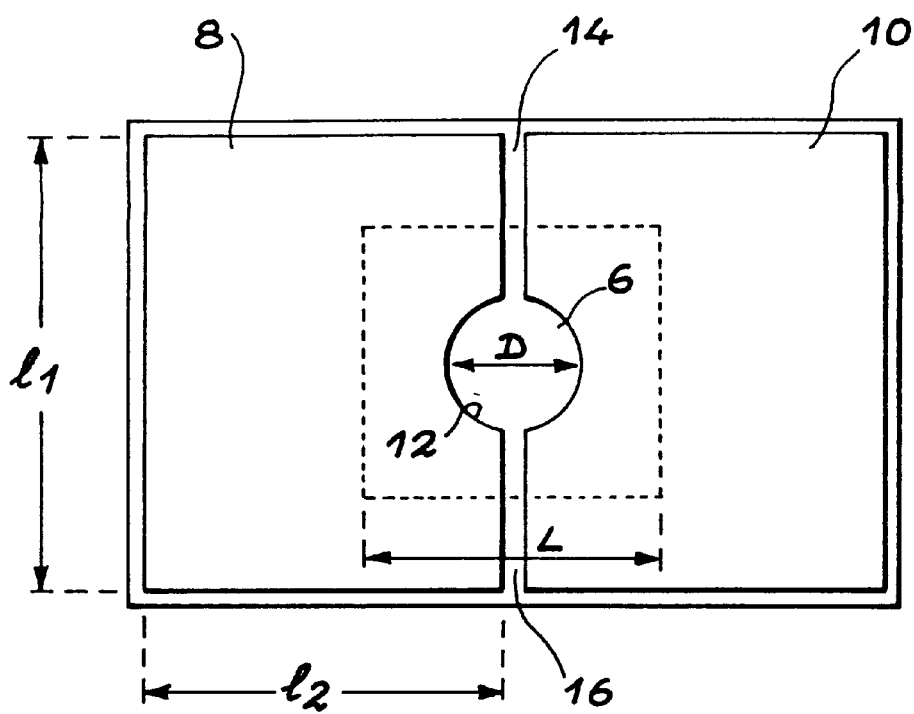
FIG. 2 is a top view of the control electrodes and movable mirror of an interferometer according to the invention.

FIG. 2 is a top view of control electrodes 8, 10 and the movable mirror. In this embodiment the control electrodes 8, 10 are constructed by electroplating a reflecting surface or membrane. The metallic deposit leaves a circular opening 12 on the reflecting surface, thereby leaving free a central zone that is reflecting and movable. The deposit leaves free two grooves 14, 16 that act to insulate the control electrodes 8, 10 from one another. In practice, the electrodes may be constructed by electroplating followed by etching of zones 12, 14, 16.

Figure 3:
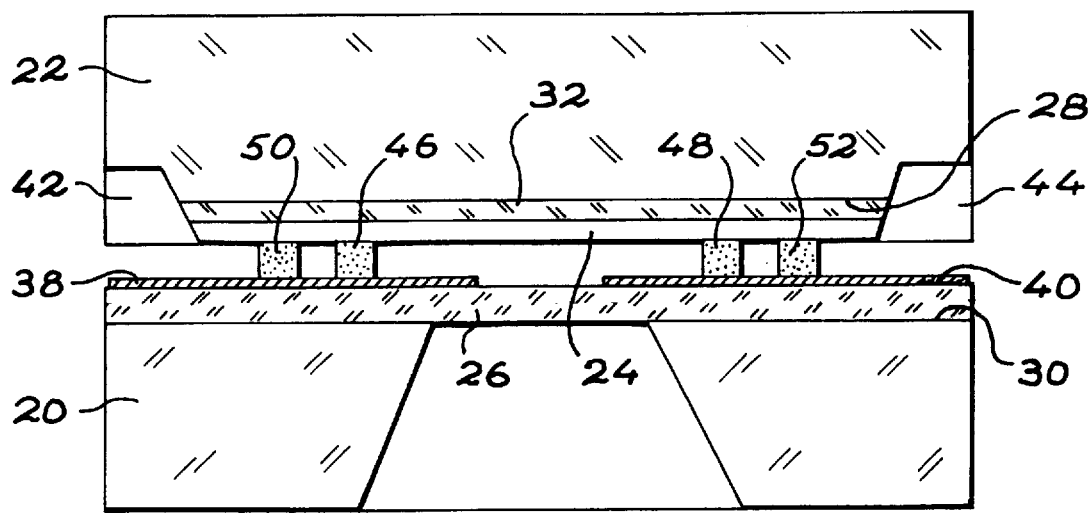
FIG. 3 is a cross section of an embodiment of an interferometer according to the invention.

FIG. 3 shows an embodiment of an interferometer according to the invention. The interferometer is constructed in two substrates 20, 22 made, for example, of SOI (Silicon On Insulator). Mirrors 32, 26 are constructed by thin film deposition and may, for example, be deposits composed of a stack of layers with different dielectrics, for example alternating layers of $SiO_2$ and Si, undoped Si being a dielectric, of thickness $\lambda/4$, on each of surfaces 28, 30 of the two substrates designed to face one another. The thickness and the number of layers of each stack to be deposited depends on the wavelength at which the filter, or interferometer, is designed to resonate, as well as the required transmission accuracy.

On mirror 32, the outer layer 24 of the stack is made of silicon that has been doped to make it conduct.

The two mirrors 32, 26 form a Fabry-Pérot cavity whose resonance wavelengths are defined by equation (1) above, distance d being the distance separating the surfaces of the two mirrors.

The fixed mirror 32 is fitted with an electrode, known as a floating electrode, 24. Mirror 26 is fitted with two control electrodes 38, 40, for example of the type described above in relation to FIG. 2. Electrical contacts are fitted to these control electrodes. Two cavities 42, 44 may be etched into the substrate 22 to allow for the passage of these electrical contacts.

The floating electrode may be created, for example, by powerful doping of substrate 22.

The two substrates are maintained in the position relative to one another required to create a Fabry-Pérot cavity of length d by means of stops 46, 48 and by sealing by means of seals or resin studs 50, 52. Vents are preferably left in the resin seals to allow the pressure inside and outside the Fabry-Pérot cavity to equalize.

Figure 4:
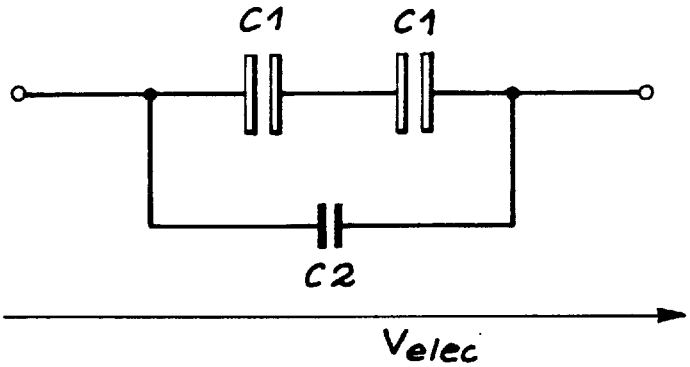
FIG. 4 is an electrical diagram of the control electrodes of an interferometer according to the invention.

FIG. 4 shows an electrical diagram of the overall structure where $C_1$ is the control capacity between the control electrode and the floating electrode, and where $C_2$ is the stray capacity due, for example, in the embodiment shown in FIG. 2, to grooves 14, 16. Again using the example shown in FIG.

2, with a diameter D=1 mm and a length L=1.37 mm (i.e. the distance between studs 46, 48), electrodes of size $l_1$=2 mm and $l_2$=1.9 mm, grooves 14, 16 of width approximately 10 µm, electrodes 8, 10 constructed by electroplating to a thickness of approximately 300 nm, gives, for a distance d=1.8 µm:

$$C_1 = 33 \text{ pF and } C_2 = 0.26 \text{ fF}.$$

Figure 5:
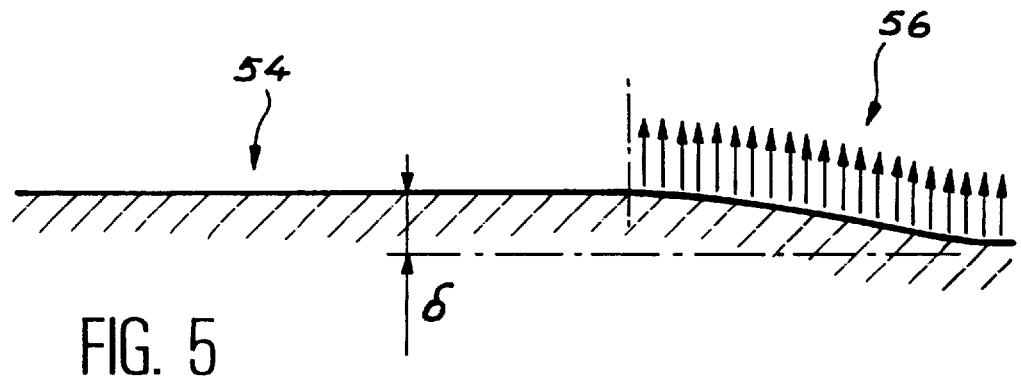
FIG. 5 shows a simulation of the deflection of a reflecting membrane in an interferometer according to the invention.

Simulated deflection of a movable mirror consisting of a membrane composed of a stack of layers of $Si_3N_4$ (thickness: 2 µm)/$SiO_2$ (thickness: 0.7 µm)/Si (thickness: 0.3 µm)/$SiO_2$ (thickness: 0.7 µm)/Si (thickness: 0.3 µm) under 30 volts confirmed that deflection of the entire central active area of the membrane was plane. In this example the voltage was applied between two parallel electrodes. The simulation was carried out using the finite element method (ANSYS). FIG. 5 shows the result: only half the membrane is shown, i.e. the central movable zone 54 and the peripheral plated zone 56; the arrows represent the zone in which the electrostatic force is applied. The deflection δ obtained is 0.32 µm.

FIGS. 6A to 6M show stages in the procedure for constructing an apparatus according to the invention.

FIGS. 6A to 6F show stages in the procedure for constructing the first section of the interferometer.

The upper surface of a substrate 60, for example of the SOI type, is given a deposit 62 of $SiO_2$. Reference 64 is also a layer of $SiO_2$. Between these two layers lies a layer 63 of Si.

Figure 6A:
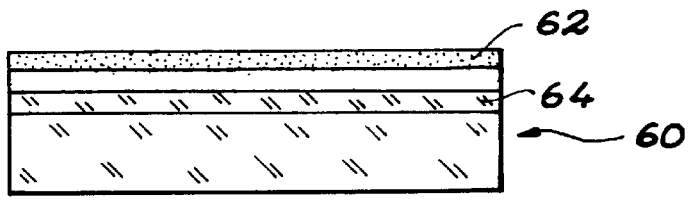
FIGS. 6A–6M show stages in constructing an interferometer according to the invention.
Figure 6B:
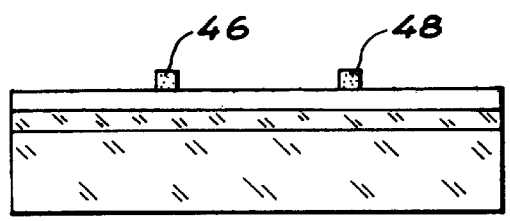
Figure 6C:
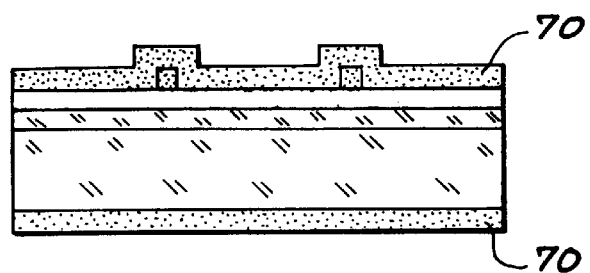
Figure 6D:
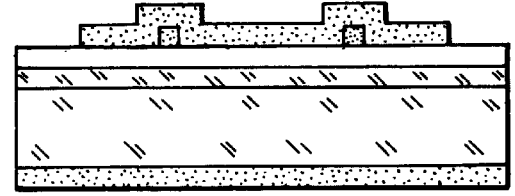
Figure 6E:
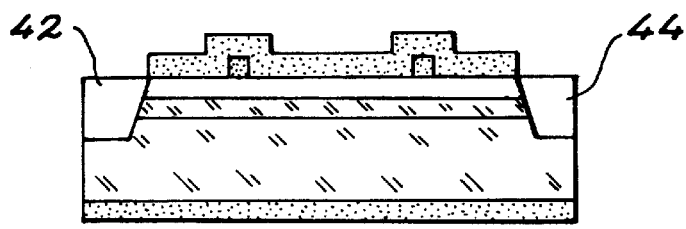
Figure 6F:
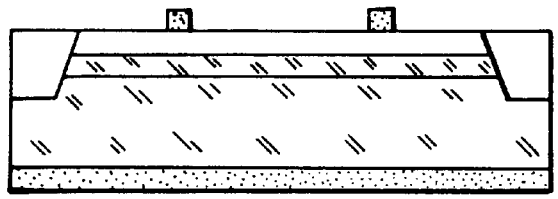
Figure 6G:
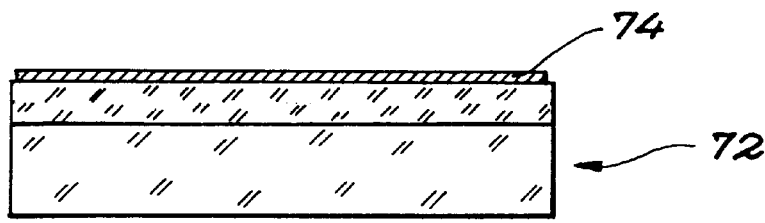
Figure 6H:
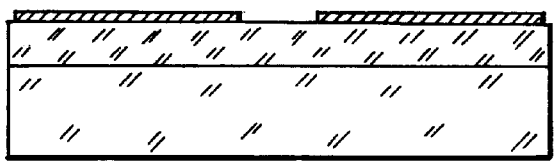
Figure 6I:
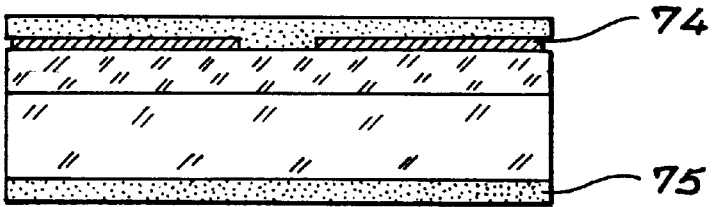
Figure 6:
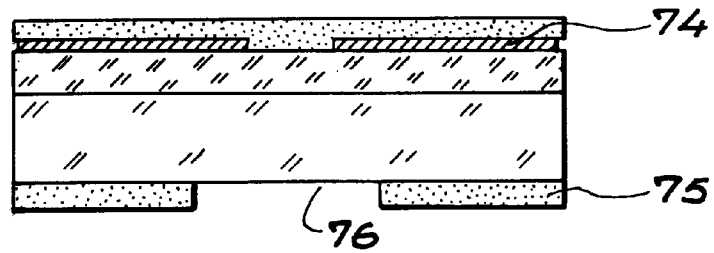
Figure 6:
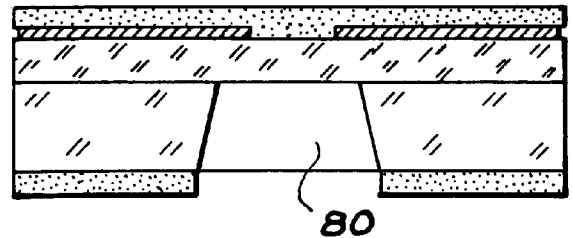
Figure 6:
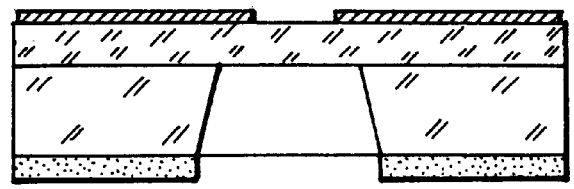
Figure 6:
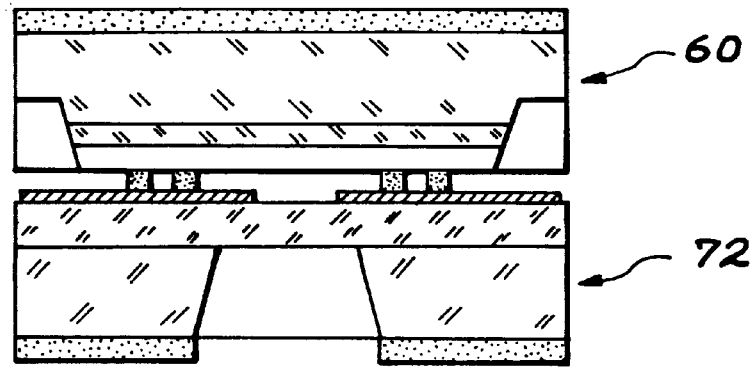

Photolithography is used in the next stage: a Schipley 1828 type positive resin is spread on the substrate and then dried. An irradiation stage follows in which the separation stops are defined (FIG. 6B; stops 46, 48 of FIG. 3). The substrate is then developed, i.e. the irradiated resin is removed; the substrate is then annealed. The stops can be etched using $CHF_3/O_2$ and the resin removed with fuming nitric acid.

Both sides of the stops thereby obtained (FIG. 6C) are then given a 1 µm thick coating 70 of $Si_3N_4$.

In the next stage (FIG. 6D) the $Si_3N_4$ positive resin of the upper surface is photolithographically etched to define cavities 42, 44; etching is by means of $CHF_3/O_2$ and the resin is removed with fuming $HNO_3$.

Cavities 42, 44 are next etched (FIG. 6E) using $CHF_3/O_2$, then with 20% KOH at 85° C. for approximately 2 hours.

Finally (FIG. 6F) the $Si_3N_4$ of the upper surface is removed by etching with $CHF_3/O_2$.

FIGS. 6G to 6L show stages in the procedure for constructing the second section of the interferometer.

As before, a substrate 72, for example of the SOI type, is used. Its upper surface is first given a 10 nm thick deposit 74 of chrome, followed by a 300 nm thick deposit of gold.

The control electrodes are then (FIG. 6H) etched using:

positive resin photolithography, etching of the gold layer using a mixture of 80 g of $NH_4I$, 21 g of $I_2$ in 400 ml of $H_2O$ and 600 ml of ethanol, etching of the chrome layer using a mixture of 25 g of $Ce(SO_4)_2$, $2NH_2SO_4$, $2H_2O$ in 625 ml of $H_2O$ and 125 ml of $HNO_3$, removal of the resin with fuming $HNO_3$.

Next (FIG. 6I) both sides are given a 1 µm coating 74 of $Si_3N_4$.

Positive resin photolithography is used to open a window 76 in the lower layer of resin (FIG. 6J); the lower $Si_3N_4$ surface is etched with $CHF_3/O_2$ and the resin is removed with fuming HNO3.

In the next stage (FIG. 6K) the lower surface of the reflecting membrane is etched using KOH 20% KOH at 85° C. for approximately 5 hours. This produces cavity 80.

The $Si_3N_4$ upper layer 74 is etched using $CHF_3/O_2$ to expose the control electrodes.

The two structures thereby obtained (FIG. 6M) are brought together and sealed using negative resin. Negative resin photolithography is used on the upper surface of substrate 60 and sealing is carried out at 200° C.

Lastly, the control electrodes are connected.

If the floating electrode is fitted to the movable mirror, the electrode is etched on this substrate and not on the substrate on which the control electrodes are formed.

The interferometer of the invention is tunable and may be integrated into any gas analysis system requiring selection of a wavelength. The tunability of the invention makes it possible to detect several gases by working wavelength. It is also possible to work in optical frequency modulation mode.

Finally, the interferometer of the invention may be used in the field of telecommunications since silicon can be micromachined to create very small cavities capable of handling resonances at wavelengths in the region of 1.3 µm and 1.55 µm.

What is claimed is:

1. An electrostatically-controlled, tunable Fabry-Pérot interferometer comprising:

a first mirror to which a floating electrode is fitted;

a second mirror to which first and second control electrodes are fitted, one of the first and second mirrors being fixed while the other is movable; and a resonant cavity of length d, defined by the first and second mirrors, the application of an electrical voltage between the two control electrodes causing displacement of the movable mirror in relation to the fixed mirror, thereby modifying the length of the resonant cavity.

2. Interferometer of claim 1 wherein the floating electrode and the first mirror are constructed on the surface of a first substrate.

3. Interferometer of claim 2 wherein the substrate is made of silicon and the floating electrode is made of doped silicon.

4. Interferometer of claim 1 wherein the control electrodes and the second mirror are constructed on the surface of a second substrate.

5. Interferometer of claim 1 wherein the movable mirror consists of a membrane etched into a substrate.

6. Interferometer of claim 4 wherein the substrate is made of silicon.

7. Interferometer of claim 1 wherein the control electrodes are formed on either side of the reflecting zone of the second mirror.

8. Interferometer of claim 1 wherein the movable mirror comprises a central reflecting zone and lateral zones on which the control electrodes or the floating electrode are mounted.

9. Interferometer of claim 1 wherein the control electrodes consist of a metallic deposit.

10. Interferometer of claim 1 wherein the electric contacts are made directly with the control electrodes.

11. Interferometer of claim 7 wherein the movable reflecting zone is circular in shape.

12. A method for constructing a tunable Fabry-Pérot interferometer comprising:

constructing a first assembly comprising a first mirror and a floating electrode fitted to the first mirror;

constructing a second assembly comprising a second mirror, having a reflecting zone and first and second control electrodes fitted to the second mirror, one of the mirrors being fixed while the other is movable; and constructing a resonant cavity of length d, defined by the first and second mirrors, by assembling the first and second assemblies, applying an electric voltage between the control electrodes causing displacement of the reflecting zone of the movable mirror relative to a fixed mirror and thereby modifying the length d of the cavity.

13. The method of claim 12 wherein the floating electrode and the first mirror are constructed on the surface of a first substrate.

14. The method of claim 13 wherein the substrate is made of silicon and the floating electrode is made by doping the substrate.

15. The method of claim 12, further comprising applying means to maintain the fixed and movable mirrors at rest at distance d.

16. The method of claim 15 wherein the means for maintaining the fixed and movable mirrors at distance d are stops.

17. The method of claim 15 wherein the means for maintaining the fixed and movable mirrors at rest at distance d are formed by etching.

18. The method of claim 13, further comprising creating lateral cavities by etching.

19. The method of claim 12 wherein the second mirror and the first and second control electrodes are constructed on the surface of a second substrate.

20. The method of claim 19 wherein the second mirror consists of a membrane, part of which is made movable by etching the second substrate.

21. The method of claim 12 wherein the control electrodes are constructed by electroplating the second mirror.

22. The method of claim 19, further comprising metallic contacts for the first and second control electrodes.

23. Interferometer of claim 5 wherein the substrate is made of silicon.

24. Interferometer of claim 8 wherein the movable reflecting zone is circular in shape.

25. The method of claim 13, further comprising applying means to maintain the fixed and movable mirrors at rest at distance d.

* * * * *